US010745057B2

(12) United States Patent
Ikeda et al.

(10) Patent No.: US 10,745,057 B2
(45) Date of Patent: Aug. 18, 2020

(54) VEHICLE PILLAR STRUCTURE

(71) Applicant: TOYOTA JIDOSHA KABUSHIKI KAISHA, Toyota-shi (JP)

(72) Inventors: Koki Ikeda, Toyota (JP); Motoya Sakabe, Nisshin (JP); Takuya Miura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 89 days.

(21) Appl. No.: 16/139,604

(22) Filed: Sep. 24, 2018

(65) Prior Publication Data
US 2019/0126986 A1 May 2, 2019

(30) Foreign Application Priority Data
Nov. 2, 2017 (JP) ................................ 2017-212950

(51) Int. Cl.
*B62D 25/04* (2006.01)
*B62D 29/00* (2006.01)

(52) U.S. Cl.
CPC ........... *B62D 25/04* (2013.01); *B62D 29/005* (2013.01)

(58) Field of Classification Search
CPC .............................. B62D 25/04; B62D 29/005
USPC .................................... 296/193.06, 201, 1.08
See application file for complete search history.

(56) References Cited

U.S. PATENT DOCUMENTS

| 4,807,925 | A | * | 2/1989 | Sakamoto | ............ | B62D 23/005 |
| | | | | | | 296/193.06 |
| 2007/0262615 | A1 | * | 11/2007 | Koizumi | ................ | B62D 25/08 |
| | | | | | | 296/201 |
| 2011/0248525 | A1 | * | 10/2011 | Lundstroem | ........... | B62D 25/04 |
| | | | | | | 296/191 |

FOREIGN PATENT DOCUMENTS

JP 2013-112077 6/2013
JP 2017-7509 1/2017

* cited by examiner

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A vehicle pillar structure includes: a pair of frame components that faces each other across a gap in a width direction of a vehicle pillar, each of the pair of frame components having a closed cross-section and extending in a longitudinal direction of the pillar, and a butt weld portion is provided at a gap side and at a vehicle exterior side at at least one frame component; a transparent component that is formed so as to be transparent and that is mounted at a vehicle exterior side of the pair of frame components; an interior garnish component that covers the pair of frame components from a vehicle cabin side; and a cover component that is disposed at the gap so as to be separated at a vehicle exterior side from the interior garnish component, and that covers the butt weld portion.

4 Claims, 4 Drawing Sheets

US 10,745,057 B2

VEHICLE PILLAR STRUCTURE

CROSS-REFERENCE TO RELATED APPLICATION

This application is based on and claims priority under 35 USC 119 from Japanese Patent Application No. 2017-212950 filed on Nov. 2, 2017, the disclosure of which is incorporated by reference herein.

BACKGROUND

Technical Field

The present disclosure relates to a vehicle pillar structure.

Related Art

In a vehicle body side portion structure disclosed in Japanese Unexamined Patent Application (JP-A) No. 2013-112077, an A pillar that is formed in a window frame shape has an A pillar upper and a sub-pillar (i.e., a pair of frame members) that have a closed cross-sectional structure and are aligned in parallel in a vehicle front-rear direction, and corner window glass is attached to a vehicle exterior side of this pair of frame members. As a result, the ability of the driver to view the outside of the vehicle is improved. Moreover, the pair of frame members are respectively covered from the vehicle cabin side by a front interior garnish member and a rear interior garnish member. As a consequence, an attractive appearance of the vehicle cabin side is ensured.

SUMMARY

However, the above-described pair of frame members have a structure in which the closed cross-section is formed by spot welding two plate materials together via welding flanges, and then bonding the corner window glass to these flanges. Because of this, a width of each frame member is made wider by a size of the flanges.

Additionally, the widths of the front interior garnish member and the rear interior garnish member that cover the pair of frame members from the vehicle cabin side are also made wider to match the widths of the respective frame members. Because of this, there is considerable room for improvement from the standpoint of further improving visibility of a vehicle occupant for the outside of the vehicle.

The present disclosure was conceived in view of the above-described circumstances and it is an object thereof, in a structure in which a transparent component is mounted at a vehicle exterior side of a pair of frame components, and the pair of frame components are covered from the vehicle cabin side by an interior garnish member, to provide a vehicle pillar structure that enables the visibility of a vehicle occupant for the outside of the vehicle to be improved while ensuring an attractive appearance of the vehicle cabin side.

A vehicle pillar structure according to a first aspect of the present disclosure is provided with a pair of frame components, a transparent component, an interior garnish component, and a cover component. The pair of frame components face each other across a gap in a vehicle pillar width direction, each one of the pair of frame components has a closed cross-section and extends in a longitudinal direction of the pillar, and at least one of the pair of frame components is provided with a butt weld portion at a gap side and at a vehicle exterior side. The transparent component is formed so as to be transparent and is mounted at a vehicle exterior side of the pair of frame components. The interior garnish component covers the pair of frame components from a vehicle cabin side, and the cover component is disposed at the gap so as to be separated at a vehicle exterior side from the interior garnish component, and covers the butt weld portion.

Note that the 'pillar width direction' of the first aspect is an orthogonal direction relative to both an inward-outward direction of a vehicle, and a longitudinal direction of the pillar when the pillar is taken as a reference point.

According to the vehicle pillar structure of the first aspect, the transparent component is mounted at the vehicle exterior side of the pair of frame components that face each other across the gap in the vehicle pillar width direction, and the pair of frame components are covered at the vehicle cabin side by the interior garnish component. Each one of the pair of frame components has a closed cross-section and extends in the longitudinal direction of the pillar, and the butt weld portion is provided at the gap side and at the vehicle exterior side of at least one of the pair of frame components. A flange for welding is no longer necessary at a location where the butt weld portion is provided. As a result, a width of at least one frame component can be made narrower. Additionally, the aforementioned butt weld portion is covered by the cover component that is disposed at the aforementioned gap at the vehicle exterior side so as to be separated from the interior garnish component. As a result, an attractive appearance of the vehicle cabin side is ensured. Moreover, compared with a structure in which the interior garnish component is extended to the vehicle exterior side so as to cover the butt weld portion, the width of the interior garnish component can be made narrower. As a result of the above-described structure, the visibility of a vehicle occupant to view the outside of the vehicle can be improved.

A vehicle pillar structure of a second aspect of the present disclosure is the above-described first aspect, and the cover component is a decorative molding component that is provided at an outer peripheral portion of the transparent component, and the decorative molding component has a fixing portion that is fixed to the transparent component, and a cover portion that extends from the fixing portion as an integral part thereof and covers the butt weld portion.

According to the vehicle pillar structure of the second aspect, the decorative molding component that is provided at the outer peripheral portion of the transparent component has a fixing portion that is fixed to the transparent component, and the cover portion that extends from the fixing portion as an integral part thereof and covers the butt weld portion. Because the butt weld portion is covered in this way by the decorative molding component, compared with a structure in which a decorative molding component and a cover component are provided separately from each other, the number of parts and the number of component mounting steps can both be reduced, and the structure can be simplified.

A vehicle pillar structure of a third aspect of the present disclosure is the above-described first or second aspects, and the transparent component is fixed by means of an adhesive agent to the at least one frame component, and the cover component covers the adhesive agent.

According to the vehicle pillar structure of the third aspect, the adhesive agent that fixes the transparent component to at least one of the frame components is covered by the cover component disposed at the gap between the pair of frame components. As a result, it is possible to prevent the adhesive agent from being visible at the gap and mining the attractive appearance. Additionally, the cover component also prevents, for example, the adhesive agent from protruding onto a gap side.

As has been described above, according to the vehicle pillar structure of each aspect of the present disclosure, in a structure in which a transparent component is mounted at a vehicle exterior side of a pair of frame components, and the pair of frame components are covered from the vehicle cabin side by an interior garnish component, it is possible to improve the visibility of a vehicle occupant for the outside of the vehicle, while ensuring an attractive appearance of the vehicle cabin side.

BRIEF DESCRIPTION OF THE DRAWINGS

Exemplary embodiments of the present disclosure will be described in detail based on the following figures, wherein.

DETAILED DESCRIPTION

Hereinafter, a vehicle pillar structure 10 according to an exemplary embodiment of the present disclosure will be described with reference to FIG. 1 through FIG. 3. Note that an arrow FR, an arrow UP, and an arrow RH (OUT) that are shown in the appropriate drawings respectively indicate a front side (i.e., a direction of forward travel), an upper side, and a right side (i.e., an outer side in a vehicle width direction) of a vehicle 12 in which the vehicle pillar structure 10 has been applied. If simple front-rear, left-right, or up-down directions are used in the following description, then, unless specifically stated otherwise, these refer respectively to the front-rear directions of a vehicle, the left-right directions of a vehicle (i.e., the vehicle width direction), and the up-down directions of a vehicle. Further, when an inner side and outer side are used in the following description, then, unless specifically stated otherwise, these refer to an inner side and outer side in the vehicle width direction.

(Structure)

Figure 1:
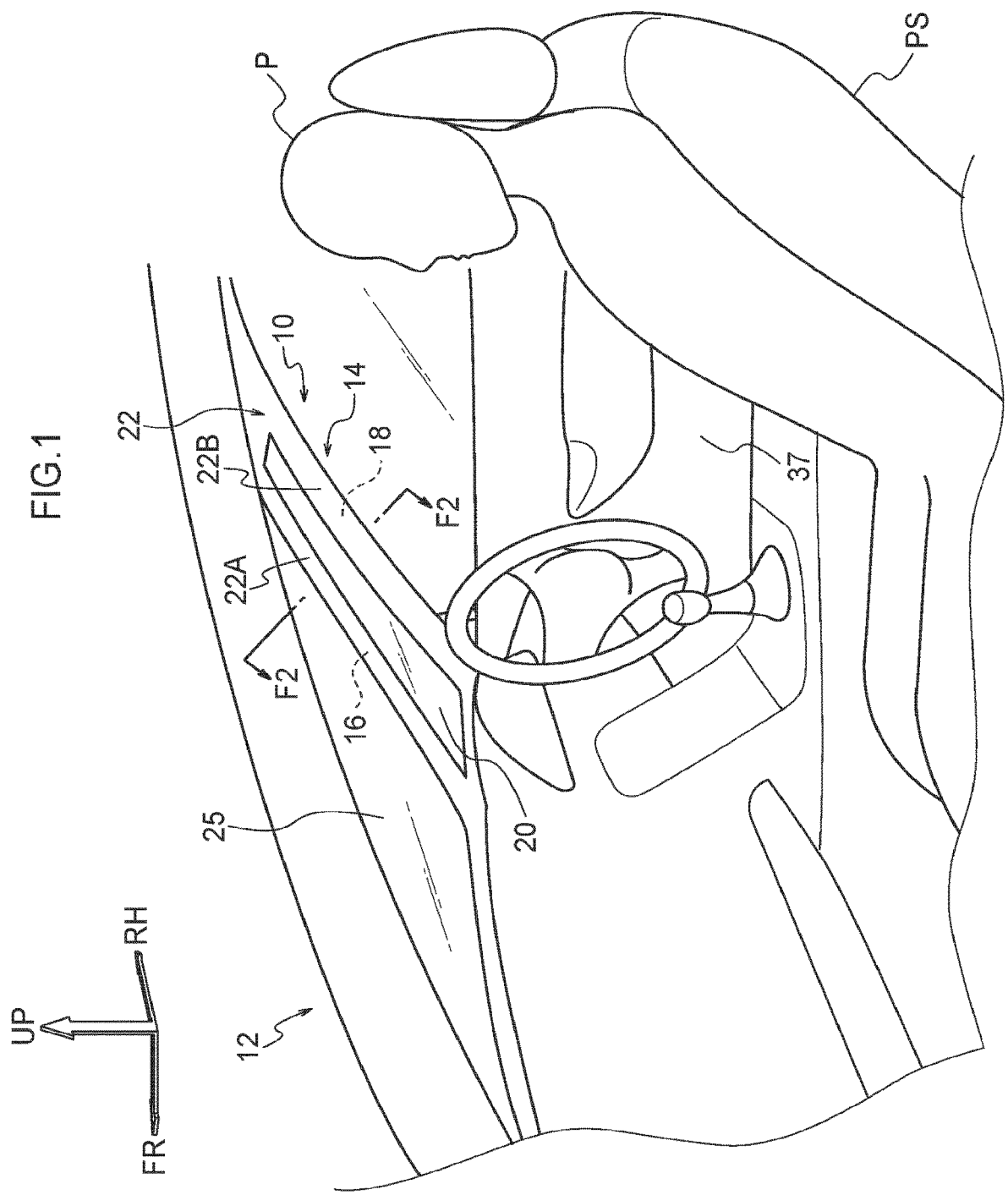
FIG. 1 is a perspective view as seen from a vehicle left side showing a front portion of a vehicle cabin in which a vehicle pillar structure according to a preferred embodiment of the present disclosure is applied.
Figure 2:
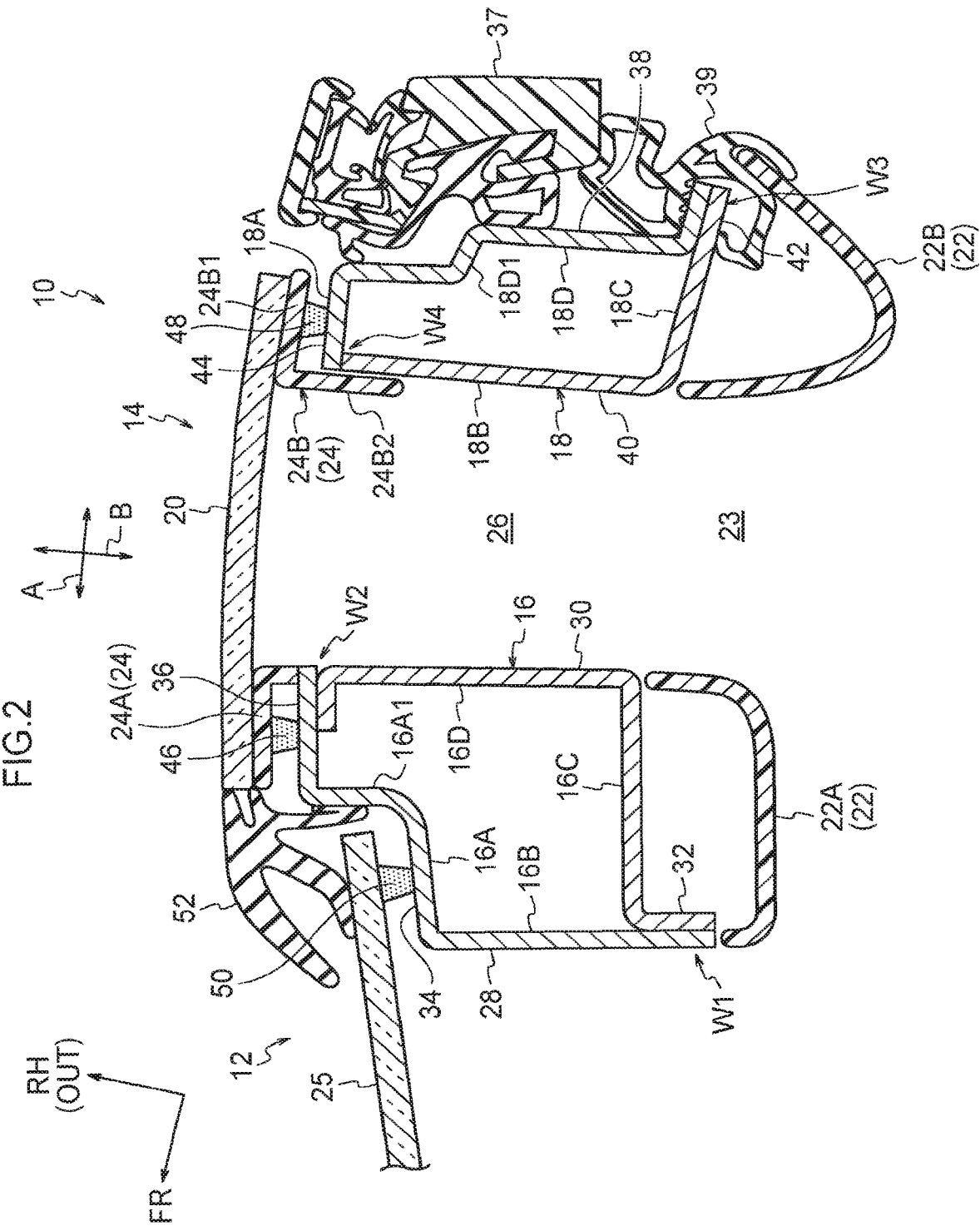
FIG. 2 is a cross-sectional view showing an enlargement of a cross-section taken along a line F2-F2 in FIG. 1.
Figure 3:
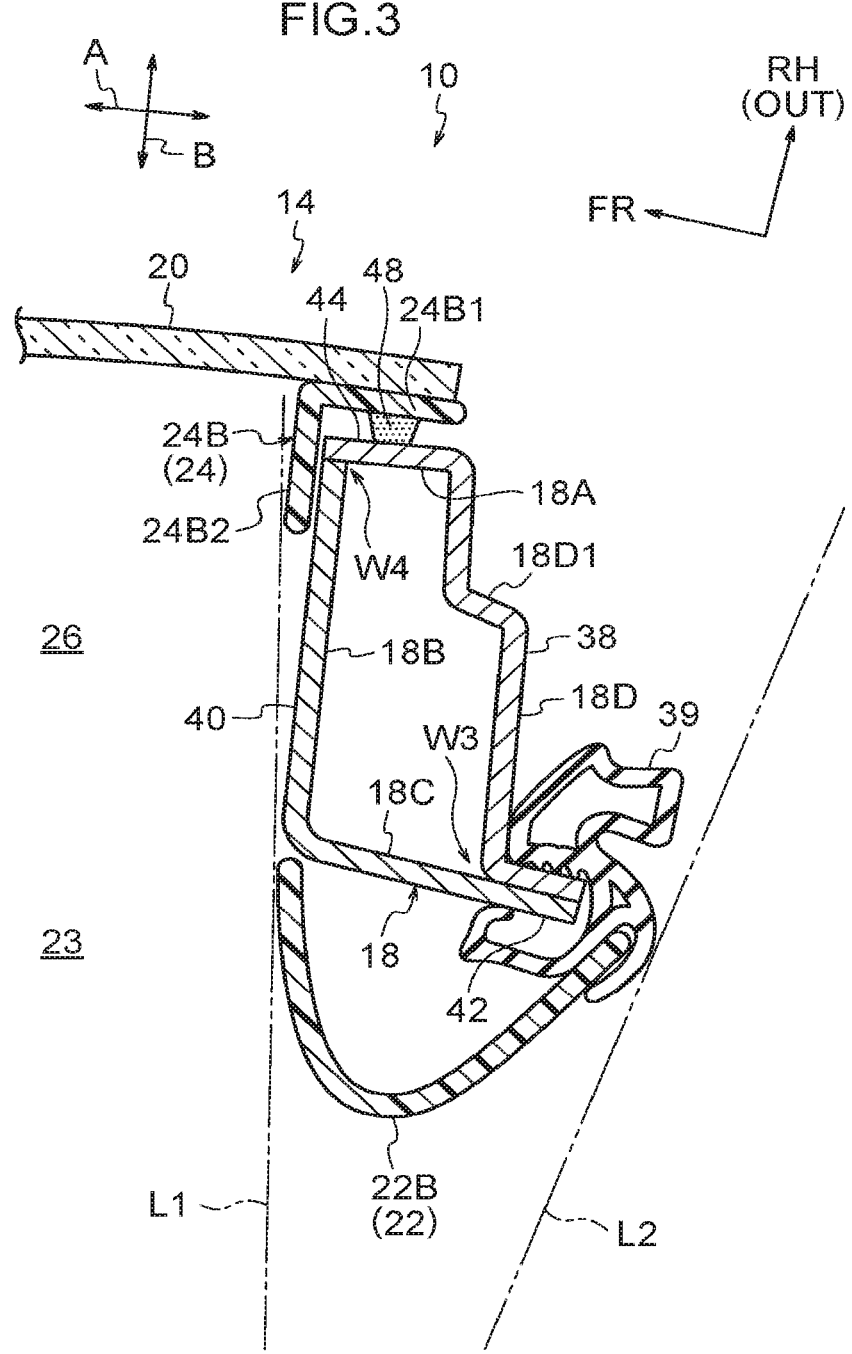
FIG. 3 is a cross-sectional view corresponding to a portion of FIG. 2.

As is shown in FIG. 1 and FIG. 2, a vehicle pillar structure 10 according to an exemplary embodiment of the present disclosure is applied to an A pillar 14, which is a pillar of a vehicle 12. Note that in FIG. 1 and FIG. 2, an A pillar 14 on the vehicle left side has been omitted from the drawing, however, the left and right pillars 14 have the same structure as each other apart from being formed having left and right symmetry. Hereinafter, the right side A pillar 14 is referred to simply as the 'A pillar 14', and any description of the structure of the left side A pillar 14 is omitted.

The A pillar 14 is provided with a pair of frame components in the form of a first frame component 16 and a second frame component 18, pillar glass 20, which is a transparent component (i.e., a transparent plate), a pillar garnish 22 (omitted from all drawings except FIG. 1), which is an interior finishing component, and a decorative molding component 24 (omitted from FIG. 1), which is provided on an outer peripheral portion of the pillar glass 20.

The first frame component 16 and the second frame component 18 extend in the longitudinal direction of the A pillar 14, and form the frame of the A pillar 14. The first frame component 16 and the second frame component 18 are inclined such that they approach the vehicle upper side as they approach the vehicle rear side, and bridge a gap between an A pillar lower member and a front header (not shown in the drawings) either directly or via a separate frame component. The first frame component 16 extends alongside a right end portion (i.e., an end portion on one side in the vehicle width direction) of a front windshield 25. The second frame component 18 is disposed at the vehicle rear side relative to the first frame component 16, and extends in parallel with the first frame component 16. The first frame component 16 and the second frame component 18 face each other on either side of a gap 26 in a width direction A (see FIG. 2 and FIG. 3) of the A pillar 14. This width direction A is an orthogonal direction relative to both an inward-outward direction B of a vehicle when the A pillar 14 is used as a reference point, and a longitudinal direction of the A pillar 14.

The first frame component 16 forms a closed cross-section that extends in the longitudinal direction of the A pillar 14 as a result of an outer panel 28 and an inner panel 30 that are formed, for example, from ultra-high tensile strength steel plate being joined together. The first frame component 16 has an outer side wall 16A that is disposed at a vehicle exterior side, a front side wall 16B that extends from a front end portion of the outer side wall 16A towards an inner side and towards the vehicle rear side, an inner side wall 16C that extends from an end portion at the inner side of the front side wall 16B towards an outer side and towards the vehicle rear side, and a rear side wall 16D that extends from a rear end portion of the inner side wall 16C towards the outer side and towards the vehicle front side. An end portion at the outer side of the rear side wall 16D is connected to a rear end portion of the outer side wall 16A. A cross-section of the outer side wall 16A when viewed from the longitudinal direction of the first frame component 16 is bent substantially in the shape of a crank, and a step-shaped portion 16A1 is formed at a central portion of the outer side wall 16A. As a result, a rear portion of the outer side wall 16A protrudes on the vehicle exterior side beyond the front portion of the outer side wall 16A.

The outer side wall 16A and the front side wall 16B are formed by the outer panel 28, while the inner side wall 16C and the rear side wall 16D are formed by the inner panel 30. A front end portion of the inner side wall 16C is bent towards the inner side so as to extend alongside the front side wall 16B, and is superimposed from the vehicle rear side onto an end portion on the inner side of the front side wall 16B. The front end portion of the inner side wall 16C is then joined to the front side wall 16B via a process such as spot welding or the like (see a weld portion W1 in FIG. 2). As a result, a flange portion 32 that extends in a flange shape towards the inner side is formed. Additionally, an end portion at the outer side of the rear side wall 16D is bent towards the vehicle front side so as to extend alongside the outer side wall 16A, and is superimposed from the inner side onto the rear portion of the outer side wall 16A. The end portion at the outer side of the rear side wall 16D is then joined to the outer side wall 16A via a process such as spot welding or the like (see a weld portion W2 in FIG. 2).

A shield joining surface 34, which is a joining surface of the windshield 25, and a transparent component joining surface 36, which is a joining surface of the pillar glass 20, are included as part of the outer peripheral surface of the first frame component 16. Specifically, a portion of the surface at the vehicle exterior side of the first frame component 16, namely, of the surface at the vehicle exterior side of the outer side wall 16A that is further to the vehicle front side (i.e., further to the inner side) from the step-shaped portion 16A1 forms the shield joining surface 34, while a portion thereof that is further to the vehicle rear side (i e, further to the outer side) from the step-shaped portion 16A1 forms the transparent component joining surface 36. The shield joining surface 34 and the transparent component joining surface 36 are each formed in a planar shape. Moreover, as a result of the step-shaped portion 16A1 being formed at the outer side wall 16A, the shield joining surface 34 is set back at the vehicle cabin side (i.e., the vehicle inner side) from the transparent component joining surface 36.

The second frame component 18 forms a closed cross-section that extends in the longitudinal direction of the A pillar 14 as a result of an outer panel 38 and an inner panel 40 that are formed, for example, from ultra-high tensile strength steel plate being joined together. The second frame component 18 has an outer side wall 18A that is disposed at a vehicle exterior side, a front side wall 18B that extends from a front end portion of the outer side wall 18A towards an inner side and towards the vehicle rear side, an inner side wall 18C that extends from an end portion at the inner side of the front side wall 18B towards the vehicle rear side and towards an outer side, and a rear side wall 18D that extends from a rear end portion of the inner side wall 18C towards the vehicle front side and towards the outer side. An end portion at the outer side of the rear side wall 18D is connected to a rear end portion of the outer side wall 18A. A cross-section of the rear side wall 18D when viewed from the longitudinal direction of the second frame component 18 is bent substantially in a W shape, and a central portion thereof is formed as a step-shaped portion 18D1.

The outer side wall 18A and the rear side wall 18D are formed by the outer panel 38, while the inner side wall 18C and the front side wall 18B are formed by the inner panel 40. An end portion at the inner side of the rear side wall 18D is bent towards the vehicle rear side so as to extend alongside the inner side wall 18C, and is superimposed from the outer side onto a rear portion of the inner side wall 18C. The end portion on the inner side of the rear side wall 18D is then joined to the inner side wall 18C via a process such as spot welding or the like (see a weld portion W3 in FIG. 2 and FIG. 3). As a result, a flange portion 42 that extends in a flange shape towards the vehicle rear side is formed. This flange portion 42 is disposed in an area that overlaps with a front end portion of a front side door 37 when viewed from the vehicle cabin side, in other words, in an area that was originally a blind spot for a vehicle occupant seated in the driver's seat (not shown in the drawings, hereinafter, referred to as a 'driver's seat occupant') who is looking outside the vehicle. An opening weather strip 39 that is made of rubber and provides a seal between the front side door 37 and the A pillar 14 is attached to the flange portion 42. Additionally, an end portion at the outer side of the front side wall 18B abuts from the inner side against the front end portion of the outer side wall 18A, and is then joined to the outer side wall 18A by butt welding (see a butt weld portion W4 in FIG. 2 and FIG. 3). This butt weld portion W4 is disposed at the end portion at the gap 26 side and at the vehicle exterior side of the second frame component 18.

A transparent component joining surface 44, which is a joining surface of the pillar glass 20, is included as part of the outer peripheral surface of the second frame component 18. Specifically, a surface at the vehicle exterior side of the second frame component 18, namely, a surface at the vehicle exterior side of the outer side wall 18A forms the transparent component joining surface 44. This transparent component joining surface 44 is formed in a planar shape.

The pillar garnish 22 is formed, for example, from resin, and forms a design surface on the vehicle cabin side of the A pillar 14. This pillar garnish 22 has a first pillar garnish portion 22A that covers the first frame component 16 from the vehicle cabin side, and a second pillar garnish portion 22B that covers the second frame component 18 from the vehicle cabin side. An aperture 23 is formed between the first pillar garnish portion 22A and the second pillar garnish portion 22B. This aperture 23 extends in the longitudinal direction of the A pillar 14.

The first pillar garnish portion 22A is disposed such that it does not protrude at a gap 26 side beyond the first frame component 16 when viewed by the driver's seat occupant. In the same way, the second pillar garnish portion 22B is disposed such that it does not protrude at a gap 26 side beyond the second frame component 18 when viewed by the driver's seat occupant. Note that L1 and L2 shown in FIG. 3 are virtual lines showing the directions of sight lines of the driver's seat occupant when the driver's seat occupant is looking at the A pillar 14.

The pillar glass 20 is formed, for example, from inorganic glass or from high-strength transparent resin, and is formed in the shape of a transparent plate. This pillar glass 20 is mounted at the vehicle exterior side of the first frame component 16 and the second frame component 18, and forms a design surface at the vehicle exterior side of the A pillar 14. The pillar glass 20 is disposed such that a plate thickness direction thereof extends in an orthogonal direction relative to the longitudinal direction of the A pillar 14, and is exposed to the vehicle cabin side via the gap 26 and the aperture 23 at the pillar garnish 22. Note that examples of a high-strength transparent resin include polycarbonate strengthened with glass fibers (PC-GF), and polycarbonate strengthened with cellulose nanofibers (PC-CNF), and the like.

The decorative molding component 24, which is formed, for example, from resin so as to be non-transparent, is provided on a surface at the vehicle cabin side of the outer peripheral portion of the pillar glass 20. The decorative molding component 24 is arranged so as to provide a border for the outer peripheral portion of the pillar glass 20, and has a front decorative molding portion 24A that extends in the longitudinal direction of the A pillar 14 alongside a front end portion of the pillar glass 20, and a rear decorative molding portion 24B that extends in the longitudinal direction of the A pillar 14 alongside a rear end portion of the pillar glass 20.

The front decorative molding portion 24A is formed in a planar shape whose plate thickness direction is the same as the plate thickness direction of the pillar glass 20, and is fixed (i.e., bonded) to the pillar glass 20 using an agent such as an adhesive or the like. The front decorative molding portion 24A is disposed between the front end portion of the pillar glass 20 and the transparent component joining surface 36 of the first frame component 16, and is fixed to the transparent component joining surface 36 via an adhesive agent 46 such as polyurethane resin (i.e., a urethane sealant) or the like. As a result, the front end portion of the pillar glass 20 is fixed to the first frame component 16 via the front decorative molding portion 24A. A rear end portion of the front decorative molding portion 24A is bent towards the vehicle cabin side, and covers the adhesive agent 46 from the vehicle rear side.

The rear decorative molding portion 24B is formed in a planar shape whose plate thickness direction is the same as the plate thickness direction of the pillar glass 20, and has a fixing portion 24B1 that is fixed to the pillar glass 20 using an agent such as an adhesive or the like, and a cover portion 24B2 that extends from a front end portion of the fixing portion 24B1 as an integral part thereof towards a vehicle cabin side. A cross-section of the rear decorative molding portion 24B as seen from the longitudinal direction of the A pillar 14 is formed in an L shape. The fixing portion 24B1 is disposed between the rear end portion of the pillar glass 20 and the transparent component joining surface 44 of the second frame component 18, and is fixed to the transparent component joining surface 44 via an adhesive agent 48 such as a urethane sealant or the like. As a result, the rear end portion of the pillar glass 20 is fixed to the second frame component 18 via the rear decorative molding portion 24B. The cover portion 24B2 extends on the vehicle cabin side beyond the butt weld portion W4, and faces the butt weld portion W4 while either coming into contact therewith, or approaching adjacently thereto from the vehicle front side. This cover portion 24B2 covers the butt weld portion W4 and the adhesive agent 48 from the vehicle front side, and the second frame component 18 is exposed to the gap 26 between the cover portion 24B2 and the second pillar garnish 22B.

An end portion (i.e., a right end portion) in the vehicle width direction of the windshield 25 is disposed at the vehicle front side and at an inner side of the pillar glass 20. The end portion in the vehicle width direction of the windshield 25 is disposed at the vehicle exterior side relative to the shield joining surface 34 of the first frame component 16, and is fixed to the shield joining surface 34 using an adhesive agent 50 such as a urethane sealant or the like. A gap between the end portion in the vehicle width direction of the windshield 25 and the front end portion of the pillar glass 20 is closed off by a rubber windshield molding 52 that is fitted onto an outer peripheral portion of the windshield 25.

In the A pillar 14 having the above-described structure, the transparent pillar glass 20 bridges the gap between the first frame component 16 and the second frame component 18. As a result, a driver's seat occupant and a vehicle occupant P sitting in a front passenger's seat PS (see FIG. 1; hereinafter, referred to as a 'front passenger's seat occupant P') are able to view the vehicle exterior through the gap 26 between the first frame component 16 and the second frame component 18.

(Actions and Effects)

Actions and effects of the present exemplary embodiment will now be described.

In the vehicle pillar structure 10 having the above-described structure, the pillar glass 20 that is transparent is mounted at the vehicle exterior side of the first frame component 16 and the second frame component 18 that face each other across the gap 26 in the width direction of the A pillar 14 of the vehicle 12, and the first frame component 16 and the second frame component 18 are covered from the vehicle cabin side by the pillar garnish 22. The first frame component 16 and the second frame component 18 each have a closed cross-section extending in the longitudinal direction of the A pillar 14, and the butt weld portion W4 is provided at the gap 26 side and at the vehicle exterior side of the second frame component 18. Welding flanges are no longer necessary in locations where this butt weld portion W4 is provided. As a result, the width dimension, in the width direction A of the A pillar 14, of the second frame component 18 can be made narrower, while the size of the closed cross-section of the second frame component 18 can be maintained.

Furthermore, the butt weld portion W4 is covered by the cover portion 24B2 of the decorative molding component 24. As a consequence, the attractive appearance of the vehicle cabin side is maintained. Moreover, this cover portion 24B2 is disposed at the vehicle exterior side away from the pillar garnish 22, so that the second frame component 18 is exposed to the gap 26 from between the cover portion 24B2 and the second pillar garnish portion 22B. Because this type of structure is employed, compared with a structure in which the second pillar garnish portion 22B is extended onto the vehicle exterior side so as to cover the butt weld portion W4, the width of the second pillar garnish portion 22B can be made narrower. As a result of the above, the visibility of the driver's seat occupant and front passenger's seat occupant P (particularly the driver's seat occupant) for the outside of the vehicle can be improved.

Figure 4:
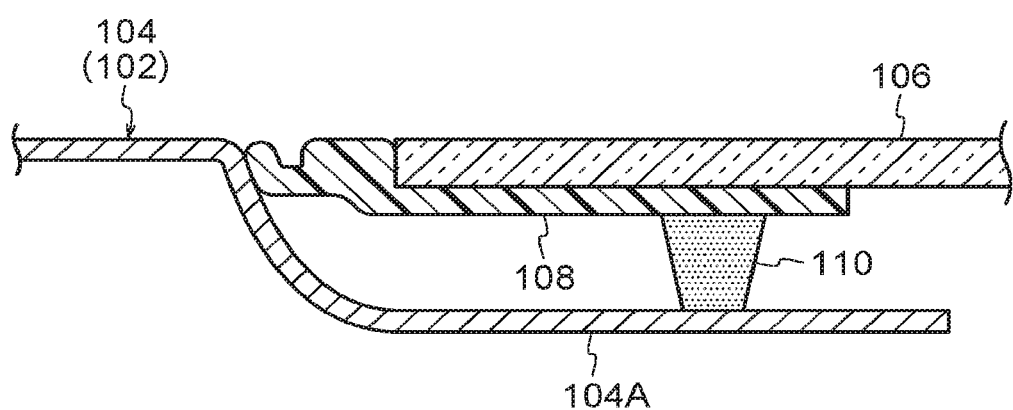
FIG. 4 is a cross-sectional view showing a comparative example.

A supplementary explanation of the above-described effects will now be given using a comparative example 100 shown in FIG. 4. In this comparative example 100, a flange portion 104A is provided at an outer panel 104 which is part of a frame component of an A pillar 102, and a decorative molding component 108 which is provided at an outer peripheral portion of pillar glass 106 is fixed by means of an adhesive agent 110 to the flange portion 104A. If this structure is employed, the width of the frame component is increased by the flange portion 104A, and the width of an A pillar garnish (not shown in the drawings) covering the frame component from the vehicle cabin side is also increased.

In contrast to this, in the present exemplary embodiment, the outer panel 38 and the inner panel 40 of the second frame component 18 are joined together via the butt weld portion W4, and the pillar glass 20 is fixed to the surface at the vehicle exterior side of the second frame component 18 (i.e., to the outer side wall 18A). As a result, because the flange portion 104A which is employed in the comparative example 100 is no longer necessary, the width of the second frame component 18 can be made narrower. Additionally, because in the structure of the present exemplary embodiment, the second pillar garnish portion 22B is not extended so that it covers the butt weld portion W4, the width of the second pillar garnish portion 22B can also be made narrower.

Moreover, in the present exemplary embodiment, the decorative molding component 24 that is provided at the outer peripheral portion of the pillar glass 20 has the fixing portion 24B1 that is fixed to the pillar glass 20, and the cover portion 24B2 that extends from the fixing portion 24B1 as an integral part thereof and covers the butt weld portion. In this way, because the butt weld portion W4 is covered by the decorative molding component 24, compared with a structure in which the decorative molding component 24 and the cover component are provided separately from each other, it is possible to reduce both the number of parts and the number of component mounting steps, and the structure can be simplified.

Moreover, in the present exemplary embodiment, the adhesive agent 48 that fixes the pillar glass 20 to the second frame component 18 is covered by the cover portion 24B2 that is disposed at the gap 26 between the first frame component 16 and the second frame component 18. As a result, it is possible to prevent the adhesive agent 48 from being visible at the gap 26 and mining the attractive appearance. Additionally, the cover portion 24B2 also prevents, for example, the adhesive agent 48 from protruding onto the gap 26 side.

(Supplementary Description of the Exemplary Embodiment)

In the above-described exemplary embodiment, it is also possible to employ a structure in which the weld portion W2 of the first frame component 16 is formed as a butt weld portion. In this case, a structure in which the decorative molding portion 24A is extended onto the vehicle cabin side so as to cover this butt weld portion may be employed.

Moreover, in the above-described exemplary embodiment, a structure in which the decorative molding component 24 that is provided at the outer peripheral portion of the pillar glass 20 is formed as a cover component is employed, however, the present disclosure is not limited to this, and it is also possible to employ a structure in which a cover component that is formed separately from the decorative molding component 24 is fixed to the second frame component 18 or the pillar glass 20.

Moreover, in the above-described exemplary embodiment, a case is described in which the vehicle pillar structure according to the present disclosure is applied to the A pillar 14 of the vehicle 12, however, the present disclosure is not limited to this, and the vehicle pillar structure according to the present disclosure can also be applied to a C pillar or the like of a vehicle. In a vehicle in which substantially triangular fixing glass (FIX glass) is provided between the A pillar and the front side door, it is also possible for a planar joining surface to which this fixing glass is joined to be set at the outer peripheral portion of the second frame component.

Furthermore, various modifications and the like may be made to the present disclosure insofar as they do not depart from the technical scope of the present disclosure. Additionally, the technical scope of the present disclosure is not limited to the above-described exemplary embodiment.

What is claimed is:

1. A vehicle pillar structure comprising:
    a pair of frame components facing each other across a gap in a width direction of a vehicle pillar, each of the pair of frame components having a closed cross-section and extending in a longitudinal direction of the pillar, and a butt weld portion being provided at a gap side and at a vehicle exterior side of a first frame component of the pair of frame components;
    a transparent component formed so as to be transparent and mounted at the vehicle exterior side of the pair of frame components;
    an interior garnish component covering the pair of frame components from a vehicle interior side of the pair of frame components; and
    a cover component disposed at the gap so as to be separated at the vehicle exterior side from the interior garnish component, and covering the butt weld portion, wherein
    the first frame component includes an outer side wall that is disposed at the vehicle exterior side, an inner side wall that is disposed at the vehicle interior side, a front side wall, and a rear side wall, the front side wall and the rear side wall respectively linking the outer side wall and the inner side wall in a horizontal cross sectional view of the first frame component,
    the butt weld portion joins the front side wall of the first frame component and the outer side wall of the first frame component, and
    an end of the outer side wall of the first frame component in the width direction and a side surface of the front side wall of the first frame component that faces the gap are substantially aligned.

2. The vehicle pillar structure according to claim 1, wherein:
    the cover component is a decorative molding component that is provided at an outer peripheral portion of the transparent component, and
    the decorative molding component includes a fixing portion that is fixed to the transparent component, and a cover portion that extends from the fixing portion as an integral part thereof and covers the butt weld portion.

3. The vehicle pillar structure according to claim 1, wherein:
    the transparent component is fixed by an adhesive agent to the first frame component, and
    the cover component covers the adhesive agent.

4. The vehicle pillar structure according to claim 1, wherein:
    the second frame component includes an outer side wall that is disposed at the vehicle exterior side, an inner side wall that is disposed at the vehicle interior side, a front side wall, and a rear side wall, the front side wall and the rear side wall respectively linking the outer side wall and the inner side wall in a horizontal cross sectional view of the second frame component, and
    an end of the outer side wall of the second frame component in the width direction and a side surface of the rear side wall of the second frame component that faces the gap are substantially aligned.

* * * * *